(12) United States Patent
Tang et al.

(10) Patent No.: US 12,021,739 B2
(45) Date of Patent: *Jun. 25, 2024

(54) DISTRIBUTED HEALTH MONITORING AND REROUTING IN A COMPUTER NETWORK

(71) Applicant: International Business Machines Corporation, Armonk, NY (US)

(72) Inventors: Gang Tang, Nanjing (CN); Hongsen Liu, Beijing (CN); Jian Guo Liu, Beijing (CN); Hong Jun Tu, Beijing (CN)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 18/119,587

(22) Filed: Mar. 9, 2023

(65) Prior Publication Data
US 2023/0216781 A1 Jul. 6, 2023

Related U.S. Application Data

(63) Continuation of application No. 17/389,734, filed on Jul. 30, 2021, now Pat. No. 11,671,353.

(51) Int. Cl.
*H04L 45/28* (2022.01)
*H04L 43/028* (2022.01)
(Continued)

(52) U.S. Cl.
CPC ............ *H04L 45/28* (2013.01); *H04L 43/028* (2013.01); *H04L 43/0811* (2013.01);
(Continued)

(58) Field of Classification Search
CPC ... H04L 45/28; H04L 43/028; H04L 43/0811; H04L 43/10; H04L 45/22; H04L 45/247; H04L 45/54; H04L 69/16; H04L 43/0817
See application file for complete search history.

(56) References Cited

U.S. PATENT DOCUMENTS

| | | | |
|---|---|---|---|
| 8,180,902 B1* | 5/2012 | Day | H04L 41/00 709/227 |
| 2010/0318665 A1* | 12/2010 | Demmer | H04L 69/40 709/227 |
| 2021/0328858 A1* | 10/2021 | Asveren | H04L 61/5007 |

OTHER PUBLICATIONS

List of all IBM related dockets, 2023.

* cited by examiner

*Primary Examiner* — Rachel J Hackenberg
(74) *Attorney, Agent, or Firm* — Garg Law Firm, PLLC; Rakesh Garg; Michael O'Keefe

(57) ABSTRACT

An embodiment detects, by a packet detection module on a first worker node, a first synchronization message (SYN) issued from a client pod on the first worker node and directed to a first server pod on a second worker node and generates a first SYN record in a connection table stored on the first worker node. The embodiment detects, by the packet detection module, a second SYN issued from the client pod and directed to the first server pod and generates a server pod status record stored in memory on the first worker node indicative of the first server pod having an unhealthy status. The embodiment identifies an available server pod having a healthy status and generates a detour routing rule in a routing table on the first worker node indicative of a revised connection in which the identified available server pod replaces the first server pod.

20 Claims, 8 Drawing Sheets

(51) Int. Cl.
*H04L 43/0811* (2022.01)
*H04L 43/10* (2022.01)
*H04L 45/00* (2022.01)
*H04L 69/16* (2022.01)

(52) U.S. Cl.
CPC .............. *H04L 43/10* (2013.01); *H04L 45/22* (2013.01); *H04L 45/54* (2013.01); *H04L 69/16* (2013.01)

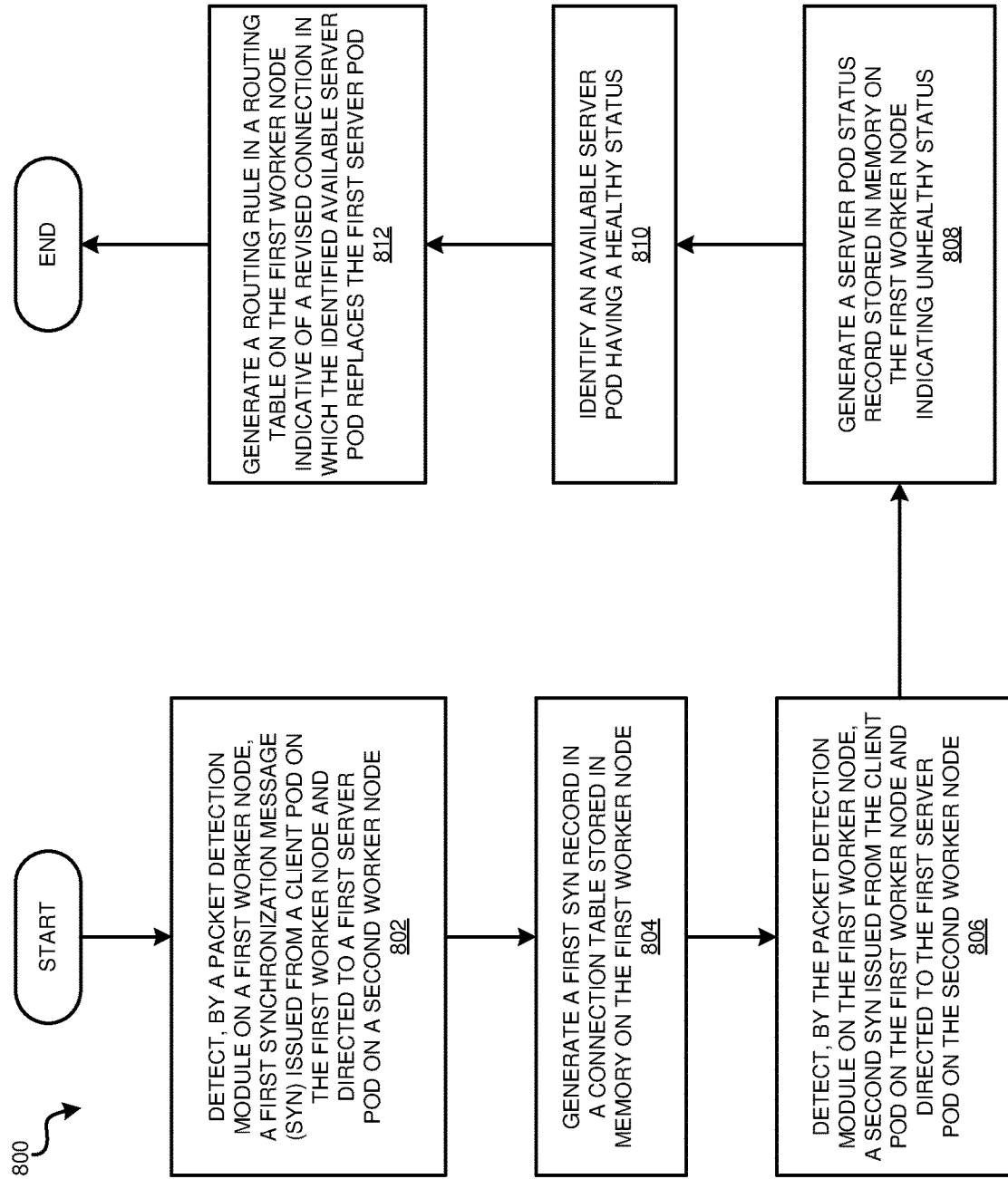

DISTRIBUTED HEALTH MONITORING AND REROUTING IN A COMPUTER NETWORK

BACKGROUND

The present invention relates generally to a method, system, and computer program product for data processing and analysis in a computer network. More particularly, the present invention relates to a method, system, and computer program product for distributed health monitoring and rerouting in a computer network.

Virtual machines (VMs) are widely used to create virtualization. VMs operate based on the computer architecture and functions of a real or hypothetical computer. A VM is a software implementation of a machine that executes programs like a physical machine. A single physical machine may support multiple VMs executed thereon and manage these VMs using a program called "hypervisor." A hypervisor or virtual machine monitor is computer software, firmware, or hardware that creates and runs virtual machines. A computer on which a hypervisor runs one or more virtual machines is called a host machine, and each virtual machine is called a guest machine.

Containers provide lightweight virtualization that allows for isolating processes and/or resources without the need of providing instruction interpretation mechanisms and/or other complexities of full virtualization. Container technology provides lightweight virtualization that allows isolating processes and resources without the need to provide instruction interpretation mechanisms and other complexities of full virtualization. Containers effectively partition the resources managed by a single host operating system (OS) into isolated groups to better balance the conflicting demands on resource usage between the isolated groups. That is, the container technology allows sharing a common OS and possibly some appropriate binary files or libraries.

SUMMARY

The illustrative embodiments provide for distributed health monitoring and rerouting in a computer network. An embodiment includes detecting, by a packet detection module on a first worker node, a first synchronization message (SYN) issued from a client pod on the first worker node and directed to a first server pod on a second worker node. The embodiment also includes generating a first SYN record in a connection table stored in memory on the first worker node, wherein the first SYN record includes data indicative of the detected first SYN. The embodiment also includes detecting, by the packet detection module on the first worker node, a second SYN issued from the client pod on the first worker node and directed to the first server pod on the second worker node. The embodiment also includes generating a server pod status record stored in memory on the first worker node, wherein the server pod status record includes data indicative of the first server pod having an unhealthy status. The embodiment also includes identifying an available server pod having a healthy status and generating a detour routing rule in a routing table on the first worker node indicative of a revised connection in which the identified available server pod replaces the first server pod as a second server pod for the client pod. Other embodiments of this aspect include corresponding computer systems, apparatus, and computer programs recorded on one or more computer storage devices, each configured to perform the actions of the embodiment.

An embodiment includes a computer usable program product. The computer usable program product includes a computer-readable storage medium, and program instructions stored on the storage medium.

An embodiment includes a computer system. The computer system includes a processor, a computer-readable memory, and a computer-readable storage medium, and program instructions stored on the storage medium for execution by the processor via the memory.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

FIG. 8 depicts a flowchart of an example process for health monitoring and rerouting in accordance with an illustrative embodiment.

DETAILED DESCRIPTION

Figure 1:
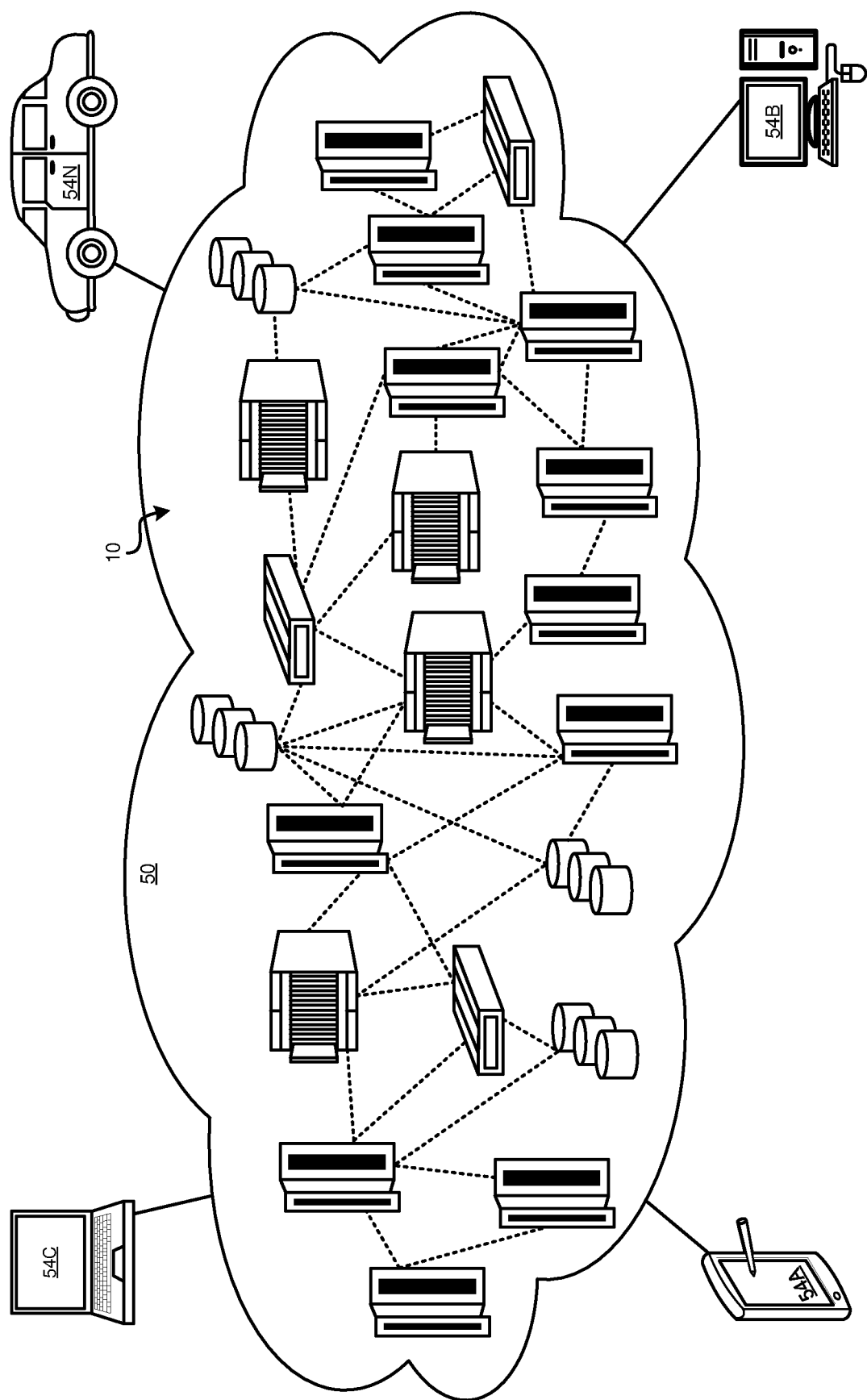
FIG. 1 depicts a cloud computing environment according to an embodiment of the present invention.

Distributed applications are computer applications implemented across multiple hosts. The group of computers, virtual machines, or containers often each execute at least part of the application's code and cooperate to provide the functionality of the application. Examples include client-server architectures, in which a client computer cooperates with a server to provide functionality to a user. Another example is an application having components replicated on multiple computers behind a load balancer to provide functionality at larger scales than a single computer. Some examples have different applications or application components on different computers that execute different aspects of the application, such as a database management system, a storage area network, a web server, an application program interface server, and a content management engine, or more simply an application and a database management system.

Often these services are executed within computational entities that provide a standardized interface to underlying computing hardware and isolate the services on the same computing device from one another. Examples include virtual machines and containers. Interfaces provided by these types of computational entities are often consistent across different types of computing hardware, making it often much easier to add and remove computing resources, transition computing resources between different cloud computing providers, and focus developer effort on the functionality and performance of the application(s).

When creating an application composed of multiple containerized micro-services, it is common practice to create private virtual networks or isolated internal networks for communication between various applications. Often these internal networks include a physical media (external to a computing device, such as a CAT 5 cable or a wireless media) over which hosts communicate, e.g., multiple virtual machines executing on a computing device that communicate with one another via a hypervisor executing on that computing device. As such, for example, a backend application is able to initiate communications with a backend database that stores data used by the backend application.

Communications between applications on such internal networks usually use a Transmission Control Protocol (TCP) based communication protocol. TCP communications are implemented using a TCP routing layer for routing raw TCP packets to the correct application and load balance those connections across multiple containers. Currently, it is known to use Iptables for layer-3 load balancing, particularly in container application environments. However, unlike known layer-4 load balancing schemes that have the ability to do health checks to detect backend failures, current IPtable layer-3 load balancing schemes lack the functionality to also perform such health checks. Layer 3 and layer 4 refer to layers of the Open Systems Interconnection (OSI) model.

To address this technical problem, disclosed embodiments to provide a way to achieve in-band health check and rerouting functionalities. Disclosed embodiments provide functionality for detecting a failed backend system and quickly rerouting the connection to another backend system. Thus, disclosed embodiments provide the ability to check the health of backend servers and reroute traffic by rerouting a connection request to another backend server.

In illustrative embodiments, a health monitoring and rerouting process intercepts connection initialization packets from and to a local client pod. In some embodiments, the process includes maintaining a connection table to track the connection state from the client pod's perspective and maintain IPtables rules to detour packets directed to an unhealthy pod of a service to a healthy pod by injecting IPtable rules, for example into a Linux host using the NFQUEUE implementation. For example, a Linux system has packet forwarding rules that define what actions to take when processing packets coming in and out of a system. The packet forwarding rules are commonly referred to as IPtables. The NFQUEUE is the NetFilter Queue and is part of the broader IPtables implementation and defines a capability to forward packets from the IPtables input and output rule processing to listening user-space processes. It should be understood that using the NFQUEUE implementation is merely an exemplary implementation and, in alternative embodiments, other similar packet forwarding processes are similarly used with similar effect.

In some embodiments, the HA checker intercepts connection initialization packets from and to a local client pod. In some embodiments, the HA checker then maintains a connection table to track the connection state from client pod's perspective and maintain IPtables rules to detour packets directed to an unhealthy pod (by Kubernetes installed IPtables rules) of a service to a healthy pod by injecting IPtable rules into a Linux host using the NFQUEUE implementation. In general terms, a Linux system has packet forwarding rules that define what actions to take when processing packets coming in and out of a system. The packet forwarding rules are commonly referred to as IPtables. The NFQUEUE is the NetFilter Queue and is part of the broader IPtables implementation and defines a capability to forward packets from the IPtables input and output rule processing to listening user-space processes. It should be understood that using the NFQUEUE implementation is merely an exemplary implementation and other similar packet forwarding processes could similarly be used with similar effect.

In some embodiments, a health monitoring and rerouting process monitors connections of a client pod on a worker node. The client pod is running a containerized application that depends on another containerized application that is replicated and running on a plurality of server pods on one or more other worker nodes. In some such embodiments, the client pod communicates with an initial server pod using TCP communications. The TCP communications commence using a connection establishment phase. Specifically, the client pod begins the process of establishing communications with the initial server pod by sending a synchronization message (SYN) to the initial server pod. The expectation under normal operating conditions is that the initial server pod will respond with a synchronize and acknowledge message (SYN-ACK). However, if the initial server pod is unhealthy, it may not respond with the expected SYN-ACK. The unhealthy state may include any of a number of causes for such a failure to respond, for example the initial server pod may be shut down, experiencing an internal error, or experiencing a network connectivity error.

In some embodiments, the process includes listening for packets issued from the client pod and intercepting the packets for processing. When the process receives a SYN from the client pod, the process generates a first SYN record in a connection table stored in memory on the worker node and forwards the first SYN to the initial server pod.

In some embodiments, the client pod waits some predetermined amount of time for a response from the initial server pod to the first SYN. After this predetermined amount of time passes, if no response is received, the client pod issues a second SYN directed to the initial server pod. The second SYN is a retry message that is responsive to the predetermined amount of time passing without receiving a SYN-ACK from the initial server pod.

In some embodiments, the process detects the second SYN issued from the client pod. In response, the process checks the connection table to determine if the second SYN is associated with any of the stored records. Since the connection table includes a record of the first SYN issued from the client pod and directed to the initial server pod, the process is able to match that record with the second SYN that is also issued from the client pod and directed to the initial server pod by matching the source and destination of the first SYN and second SYN packets. The process is also able to determine that there are no further records associated with this source and destination combination. The process considers the destination server pod unhealthy if a second consecutive SYN has been sent to that server pod from a client pod because the server pod did not acknowledge the first SYN. In some embodiments, the process generates a server pod status record that includes data indicative of the initial server pod having an unhealthy status and stores this server pod status record in a status table in memory on the worker node.

In some embodiments, the process identifies an available server pod as a replacement server pod that has a healthy status and the same containerized software as the initial server pod. The process generates a detour routing rule in an IPtable requiring packets sent from the client pod to be routed to the replacement server pod. The process then allows the second SYN packet to proceed. As a result of the new detour routing rule in the IPtable, the second SYN packet will be delivered to the replacement server pod instead of the initial server pod.

In some embodiments, since the client pod is no longer trying to establish a connection with the initial server pod, the process deletes the SYN record for the first SYN from the connection table, and creates a SYN record for the second SYN that is being directed to the replacement server pod. Thus, the second SYN will be a first SYN record in the connection table associated with the connection being established between the client pod and the replacement server pod.

Over time, as the client pod and any additional client pods on the worker node establish and finish connections with various other pods, including the replacement server pod, the connection table stores records indicative of connection states of the client pod and other pods on the worker node. Also, as unhealthy server pods are detected, detour routing rules are added to the IPtable to reroute the connection to a healthy server pod. To avoid these detour routing rules from accumulating when not needed, in some embodiments, the process periodically checks whether there are active connections in the connection table for the detour routing rules in the IPtable. If there is no active connection detected for a detour routing rule in the IPtable for N consecutive checks (where N is any desired integer greater than zero), then the process removes that detour routing rule. In some embodiments, the process accomplishes this by iterating through each record in the connection table, and comparing data in each record to the detour routing rules. For a given detour routing rule, the process increments a counter upon determining that each record in the connection table lacks data that matches the given detour routing rule. The process compares the counter to a counter threshold value N. The process then deletes the given detour routing rule if the value of the counter has reached the threshold value N.

For the sake of clarity of the description, and without implying any limitation thereto, the illustrative embodiments are described using some example configurations. From this disclosure, those of ordinary skill in the art will be able to conceive many alterations, adaptations, and modifications of a described configuration for achieving a described purpose, and the same are contemplated within the scope of the illustrative embodiments.

Furthermore, simplified diagrams of the data processing environments are used in the figures and the illustrative embodiments. In an actual computing environment, additional structures or components that are not shown or described herein, or structures or components different from those shown but for a similar function as described herein may be present without departing the scope of the illustrative embodiments.

Furthermore, the illustrative embodiments are described with respect to specific actual or hypothetical components only as examples. The steps described by the various illustrative embodiments can be adapted for providing explanations for decisions made by a machine-learning classifier model, for example.

Any specific manifestations of these and other similar artifacts are not intended to be limiting to the invention. Any suitable manifestation of these and other similar artifacts can be selected within the scope of the illustrative embodiments.

The examples in this disclosure are used only for the clarity of the description and are not limiting to the illustrative embodiments. Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific code, contrastive explanations, computer readable storage medium, high-level features, historical data, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or architectures therefor, may be used in conjunction with such embodiment of the invention within the scope of the invention. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

With reference to FIG. 1, this figure illustrates cloud computing environment 50. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
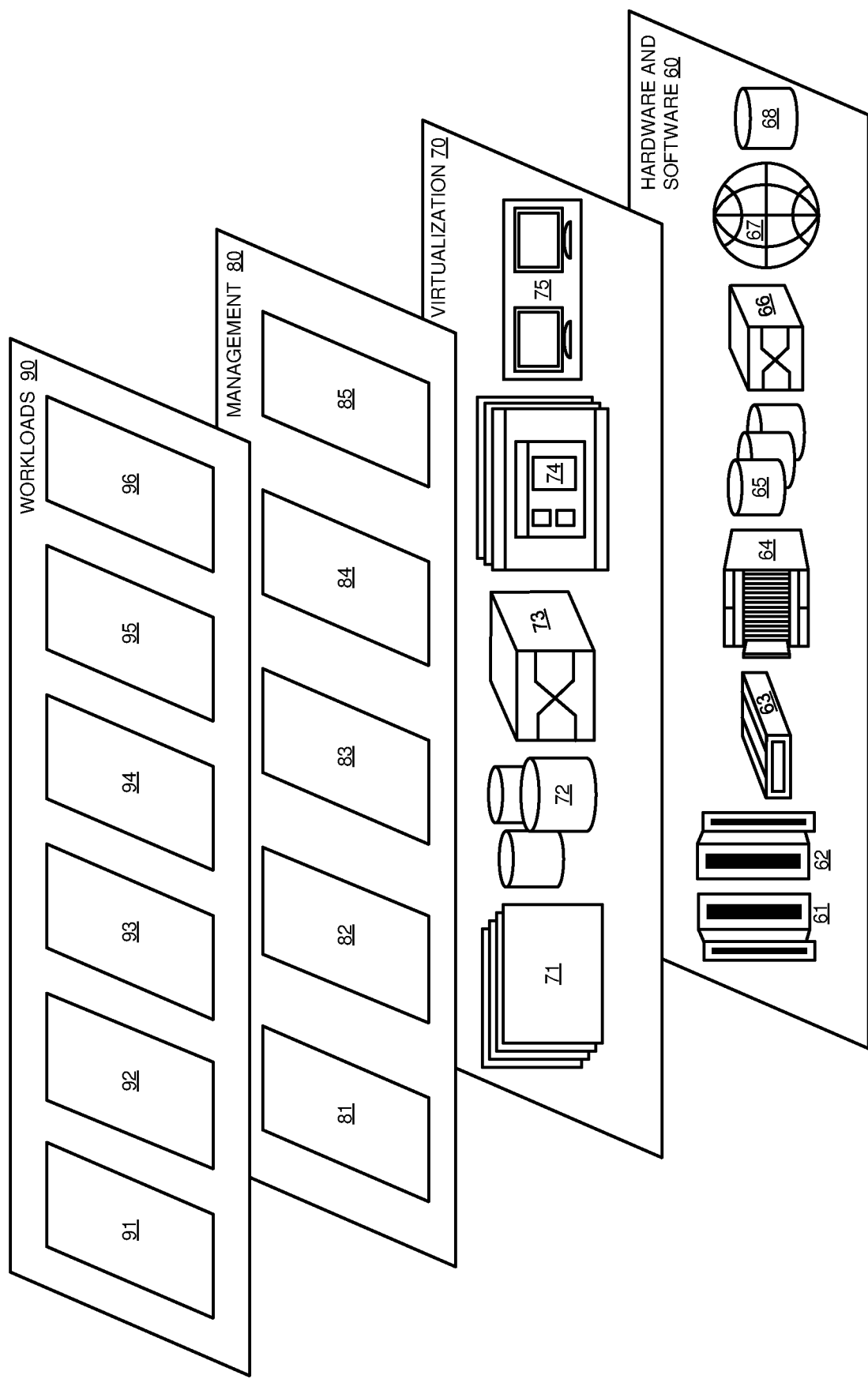
FIG. 2 depicts abstraction model layers according to an embodiment of the present invention.

With reference to FIG. 2, this figure depicts a set of functional abstraction layers provided by cloud computing environment 50 (FIG. 1). It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and health monitoring and rerouting processing 96.

Figure 3:
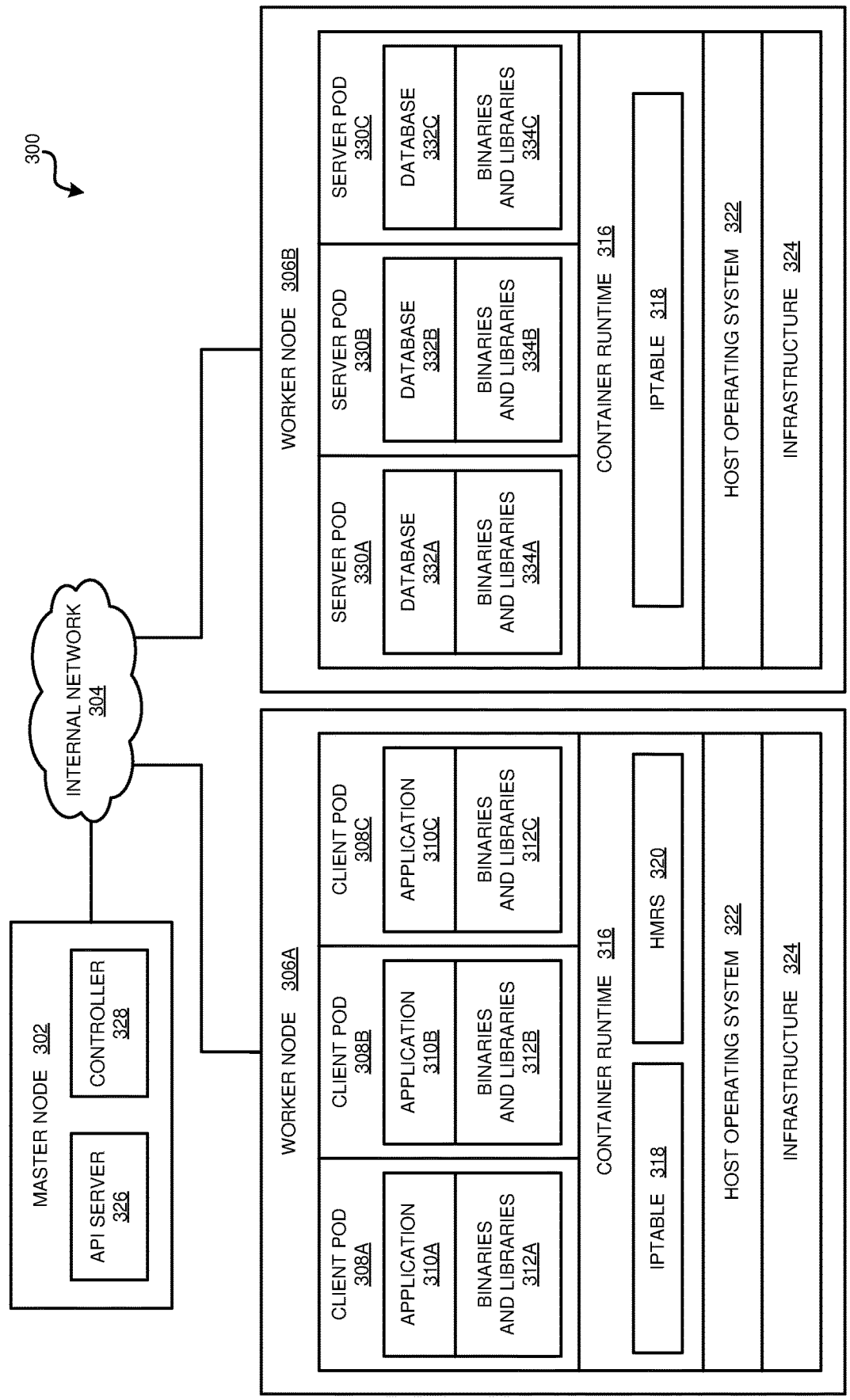
FIG. 3 depicts a block diagram of an example container orchestration platform in accordance with an illustrative embodiment.

With reference to FIG. 3, this figure depicts a block diagram of an example container orchestration platform 300 in accordance with an illustrative embodiment. The example embodiment includes a master node 302 and worker nodes 306A and 306B that communicate with each other across an internal network 304. The worker node 306A includes a health monitoring and rerouting system (HMRS) 320 that monitors for, and repairs, connectivity issues between the worker node 306A and other nodes as described herein. In a particular embodiment, HMRS 320 is implemented as health monitoring and rerouting processing 96 of FIG. 2.

In some embodiments, the container orchestration platform 300 comprises one or more clusters. A cluster is a collection of compute, storage, and networking resources that the container orchestration platform 300 uses to run the various workloads of a network. Each cluster comprises one or more hosts (physical servers and/or virtual machines). In the illustrated embodiment, the master node 302 and worker nodes 306A and 306B (collectively, "306") represent a single cluster. In this example, there is one master node 302, but other embodiments may include multiple master nodes as needed to provide high availability.

The master node 302 provides a control plane for a cluster. The master node 302 is responsible for the global, cluster-level scheduling of pods (set of one or more containers) and the handling of events (e.g., starting up a new pod when additional computing resources are needed). The master node 302 includes an Application Programming Interface (API) server 326 and a controller 328. The master components can run on any host in the cluster but usually run on the same (physical or virtual) machine without worker nodes.

In the illustrated embodiment, the API server 326 operates as the front-end of the control plane, and exposes the API of the container orchestration platform 300. The API server 326 scales horizontally (e.g., scale by deploying more instances) as it can be stateless.

In the illustrated embodiment, the controller 328 is a collection of various managers rolled up into one binary. In some embodiments, the controller 328 includes one or more of a node controller, replication controller, endpoints controller, service controller, volume controller, and others. The node controller is responsible for noticing and responding when nodes go down. The replication controller is responsible for maintaining the correct number of pods for every replication controller in the system. The endpoints controller populates endpoints (e.g., pods). The service controller is responsible for creating, updating, and deleting network services (e.g., firewalling, load balancing, deep packet inspection, etc.). The volume controller is responsible for creating, attaching, and mounting volumes.

In the illustrated embodiment, each of worker nodes 306 includes a container runtime 316 usable for obtaining a containerized application image from a container registry, unpacking the containerized application, and running the containerized application. In the illustrated embodiment, each container runtime 316 includes an IPtable 318. The IPtable 318 includes one or more networking and port forwarding rules that control the network connections between pods (and between nodes). In some embodiments, each of the worker nodes 306 corresponds to a single host, which is a physical or virtual machine. In some embodiments, each of worker nodes 306 includes a host operating system 322 and related infrastructure 324 usable for executing the container runtime 316, the containerized applications, and/or related software.

A pod is the unit of work in the container orchestration platform 300. Pods can help to manage groups of closely related containerized applications. In the illustrated embodiment, the containerized applications include an application replicated on each of client pods 308A, 308B, and 308C (collectively, "308") as applications 310A, 310B, and 310C (collectively, "310"), and include a database replicated on each of server pods 330A, 330B, and 330C (collectively, "330") as databases 332A, 332B, and 332C (collectively, "332"). In the illustrated embodiment, the applications 310 depend on databases 332 to accomplish their tasks. A containerized application is a standard unit of software that packages up code and all its dependencies so the application runs quickly and reliably from one computing environment to another. For example, in the illustrated embodiment, the applications 310A-310C are packaged with binaries and libraries 312A-312C and the databases 332A-332C are packaged with binaries and libraries 334A-334C. While the pods 308 and 330 are shown with single containerized applications, alternative embodiments include pods that include more than one containerized applications each.

In the illustrated embodiment, the container orchestration platform 300 enables intra-node pod-to-pod communication within the same node via local file system, any IPC mechanism, or localhost. In various embodiments, the container orchestration platform 300 supports various approaches for inter-node communication or pod-to-pod communication across nodes via the internal network 304, including L2 (switching), L3 (routing), and overlay networking. In some embodiments, the L2 approach involves attaching an L2 network to a node infrastructure 324, such as a physical network interface controller (NIC), and exposing the pod directly to the underlying physical network without port mapping. In some embodiments, the L3 approach may not use overlays in the data plane, and pod-to-pod communication can happen over IP addresses leveraging routing decisions made by node hosts and external network routers. Pod-to-pod communication can utilize Border Gateway Protocol (BGP) peering to not leave the host, and NAT for outgoing traffic. An overlay approach can use a virtual network that may be decoupled from the underlying physical network using tunneling technology (e.g., Virtual Extensible LAN (VXLAN), Generic Routing Encapsulation (GRE), Segment Routing (SR), etc.). Pods in the virtual network can find each other via tunneling. In addition, L2 networks can be isolated from one another, and L3 routing can be utilized for inter-node pod-to-pod communication.

Figure 4:
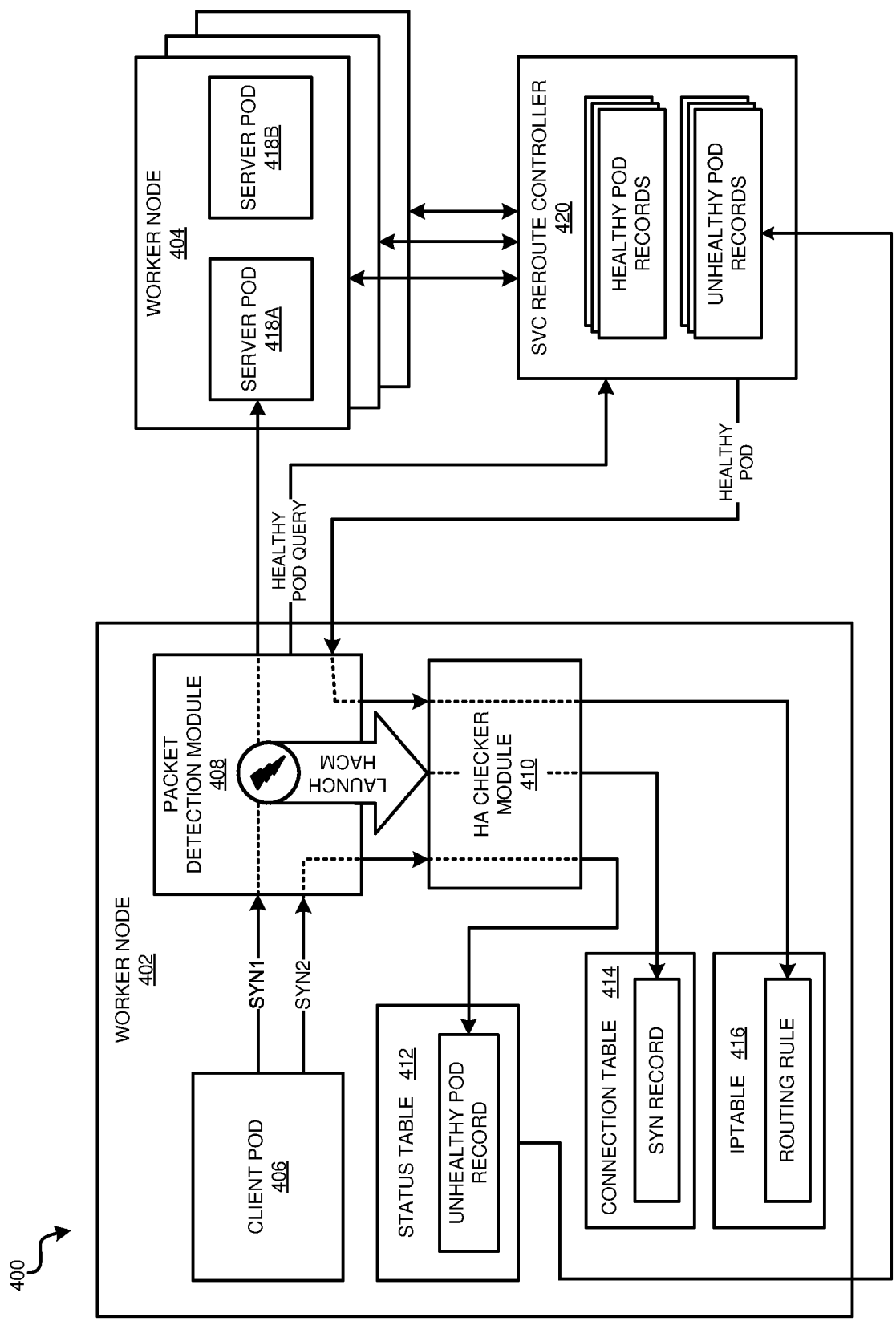
FIG. 4 depicts conceptual operation paths for exemplary operations of a container orchestration platform in accordance with an illustrative embodiment.

With reference to FIG. 4, this figure depicts conceptual operation paths for exemplary operations of a container orchestration platform 400 in accordance with an illustrative embodiment. The conceptional operation paths shown in FIG. 4 are non-limiting and high-level examples only provided to aid in the understanding of the present disclosure. The example embodiment includes a worker node 402 that has a client pod 406, and includes one or more worker nodes 404 that each have server pods 418A and 418B (collectively, "418"). In a particular embodiment, the client pod 406 is an example of client pods 308 of FIG. 3, and the server pods 418 are examples of the server pods 330 of FIG. 3.

In the illustrated embodiment, the worker node 402 includes a packet detection module 408, a high availability checker module (HACM) 410, and a connection table 414, which collectively constitute an embodiment of an HMRS that monitors for, and repairs, connectivity issues between the worker node 402 and other worker nodes 404. In alternative embodiments, the worker node 402 includes some or all of the HMRS functionality described herein but grouped differently into one or more modules. In some embodiments, the functionality described herein is distributed among a plurality of systems, which can include combinations of software and/or hardware based systems, for example Application-Specific Integrated Circuits (ASICs), computer programs, or smart phone applications. For example, in a particular embodiment, the packet detection module 408, high availability (HA) checker module 410, and connection table 414 are, collectively, an example of the HMRS 320 of FIG. 3. The worker node 306A includes a health monitoring and rerouting system (HMRS) 302 that monitors for, and repairs, connectivity issues between the worker node 306A and other nodes as described herein.

In some embodiments, at runtime, the client pod 406 is running a containerized application (e.g., application 310 of FIG. 3). In some such embodiments, the containerized application running on the client pod 406 depends on another containerized application that is replicated and running on a plurality of server pods 418 to accomplish its tasks.

In the illustrated embodiment, the client pod 406 communicates with a server pod 418A using TCP communications. The TCP communications commence using a connection establishment phase. Specifically, the client pod 406 begins the process of establishing communications with the server pod 418A by sending a synchronization message (SYN) to the server pod 418A. In FIG. 4, this initial SYN is shown as SYN1. The expectation under normal operating conditions is that the server pod 418A will respond with a synchronize and acknowledge message (SYN-ACK). However, if the server pod 418A is unhealthy, it may not respond with the expected SYN-ACK. The unhealthy state may include any of a number of causes for such a failure to respond, for example the server pod 418A may be shut down, experiencing an internal error, or experiencing a network connectivity error. The embodiment shown in FIG. 4 illustrates conceptional operation paths for this scenario in which the server pod 418A fails to respond to the SYN.

In the illustrated embodiment, the packet detection module 408 runs as a daemon set on the worker node 402 that listens for packets issued from the client pod 406 and intercepts the packets for HMRS processing. As shown in FIG. 4, when the packet detection module 408 receives SYN1, it launches an instance of the HACM 410 for the containerized application running on the client pod 406. Upon launching, the HACM 410 generates a first SYN record in a connection table 414 stored in memory on the worker node 402. The packet detection module 408 also forwards the SYN1 to the server pod 418A.

In this example, the server pod 418A is unhealthy and therefore does not send a response to the SYN1. Meanwhile, the client pod 406 waits some predetermined amount of time for a response from the server pod 418A to the SYN1. After this predetermined amount of time passes, the client pod 406 issues a second SYN, shown as SYN2, directed again to the server pod 418A. The SYN2 is a retry message that is responsive to the predetermined amount of time passing without receiving a SYN-ACK from the server pod 418A.

In the illustrated embodiment, the packet detection module 408 continues to run as a daemon set on the worker node 402 that listens for packets issued from the client pod 406. The packet detection module 408 detects the SYN2 issued from the client pod 406. The packet detection module 408 notifies the HACM 410 of the SYN2. In response, the HACM 410 checks the connection table 414 to determine if the SYN2 is associated with any of the stored records. Since the connection table 414 includes a record of the SYN1 issued from the client pod 406 and directed to the server pod 418A, the HACM 410 is able to match that record with the SYN2 that is also issued from the client pod 406 and directed to the server pod 418A by matching the source and destination of the SYN1 and SYN2 packets. The HACM 410 is also able to determine that there are no further records associated with this source and destination combination. The HACM 410 then applies a rule that requires the HACM 410 to consider the destination server pod unhealthy if a second consecutive SYN has been sent to that server pod from a client pod because the server pod did not acknowledge the first SYN. In the illustrated embodiment, this rule requires the HACM 410 to generate a server pod status record that includes data indicative of the server pod 418A having an unhealthy status and store this server pod status record in the status table 412 in memory on the worker node 402.

The HACM 410 also notifies the packet detection module 408 that the destination of the SYN2—the server pod 418A—has an unhealthy status. In response the packet detection module 408 issues a healthy pod query to a service (SVC) reroute controller 420. The healthy pod query is a request for the SVC reroute controller 420 to identify an available server pod that has a healthy status and the same containerized software (e.g., database 332 of FIG. 3) as the server pod 418A. The SVC reroute controller 420 maintains records of healthy and unhealthy pods. The SVC reroute controller 420 also receives the new unhealthy pod record for server pod 418A and includes the new unhealthy pod record with the other unhealthy pod records that the SVC reroute controller 420 maintains. The SVC reroute controller 420 identifies a healthy pod and issues a response to the packet detection module 408 with data indicative of the healthy pod that will serve as a replacement server pod for the unhealthy server pod 418A. This replacement server pod may be on the same node as server pod 418A or on a different node. For the sake of providing an example, the server pod 418B may be identified as a healthy pod and selected as the replacement server pod to replace the server pod 418A. In some embodiments, the data indicative of the replacement server pod will be data indicative of the server pod 418B. In some embodiments, the data indicative of the server pod 418B includes an IP address of the server pod 418B.

Upon receiving the data for the server pod 418B, the packet detection module 408 notifies the HACM 410 that the server pod 418B will be the replacement server pod. In response the HACM 410 generates a detour routing rule in the IPtable 416 stored in memory on the worker node 402 requiring packets sent from the client pod 406 to be routed to the server pod 418B. At this point, the packet detection module 408 may allow the SYN2 packet to proceed. As a result of the new detour routing rule in the IPtable 416, the SYN2 packet will be delivered to the server pod 418B instead of the server pod 418A.

Also, since the client pod 406 is no longer trying to establish a connection with the server pod 418A, the SYN record for the SYN1 may be deleted from the connection table 414. However, the HACM 410 will create a SYN record for the SYN2 that is being directed to the server pod 418B. Thus, the SYN2 will be a first SYN record in the connection table 414 associated with the connection being established between the client pod 406 and the server pod 418B. As a result, the process described in connection with FIG. 4 may repeat if the server pod 418B fails to acknowledge the SYN2.

Over time, as the client pod 406 and any additional client pods on the worker node 402 establish and finish connections with various other pods, including the server pods 418, the connection table 414 stores records indicative of connection states of the client pod 406 and other pods on the worker node 402. Also, as unhealthy server pods are detected, detour routing rules are added to the IPtable 416 to reroute the connection to a healthy server pod. To avoid these detour routing rules from accumulating when not needed, in some embodiments, the HACM 410 periodically checks whether there are active connections in the connection table 414 for the detour routing rules in the IPtable 416. If there is no active connection detected for a detour routing rule in the IPtable 416 for N consecutive checks (where N is any desired integer greater than zero), then the HACM 410 removes that detour routing rule. In some embodiments, the HACM 410 accomplishes this by iterating through each record in the connection table 414, and comparing data in each record to the detour routing rules. For a given detour routing rule, the HACM 410 increments a counter upon determining that each record in the connection table lacks data that matches the given detour routing rule. The HACM 410 compares the counter to a counter threshold value N. The HACM 410 then deletes the given detour routing rule if the value of the counter has reached the threshold value N.

Figure 5:
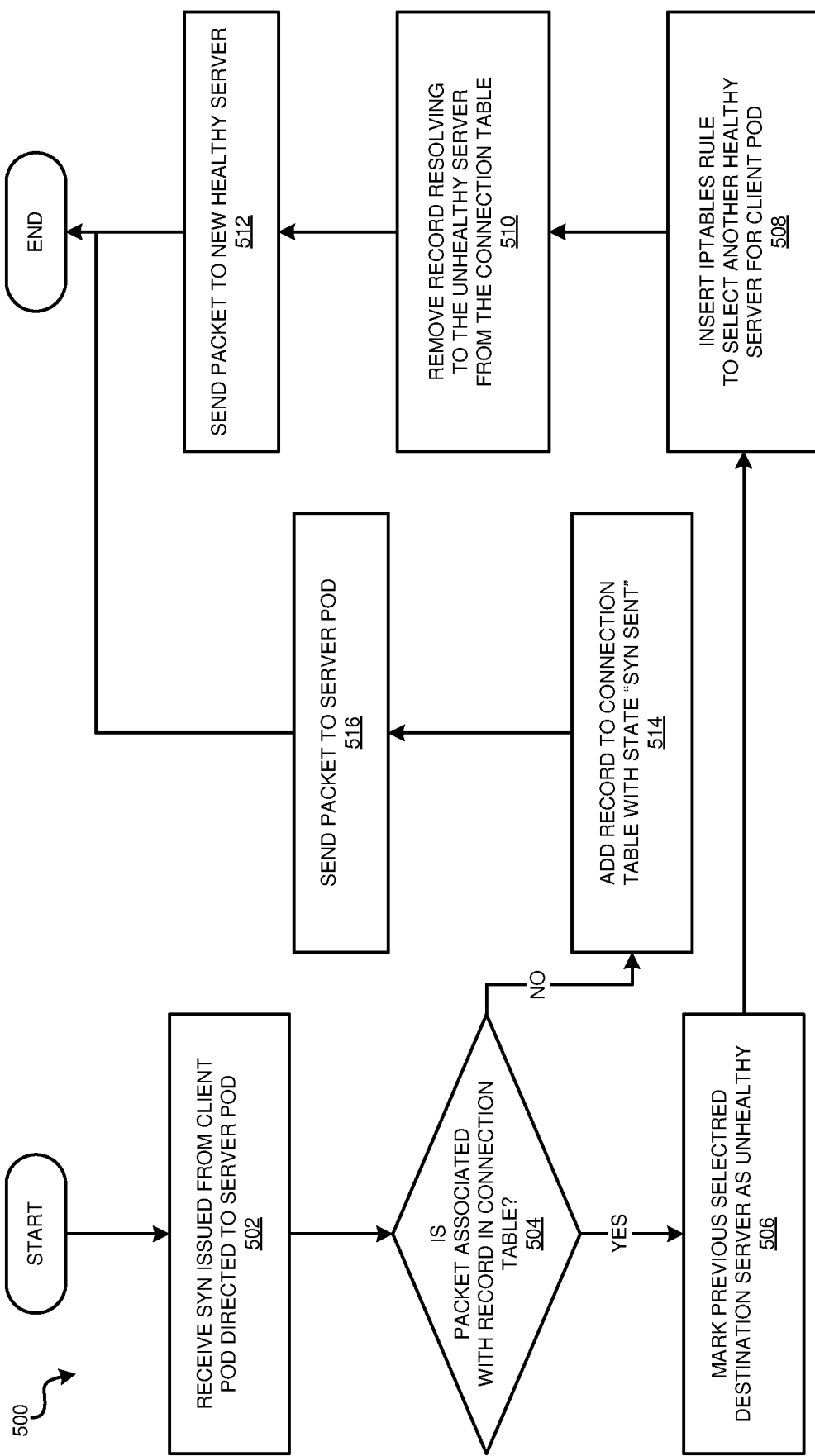
FIG. 5 depicts a flowchart of an example process for health monitoring and rerouting in accordance with an illustrative embodiment.

With reference to FIG. 5, this figure depicts a flowchart of an example process 500 for health monitoring and rerouting in accordance with an illustrative embodiment. In a particular embodiment, the HMRS 320 of FIG. 3 or the HMRS illustrated in FIG. 4 carries out the process 500.

In the illustrated embodiment, the process 500 shows a non-limiting and high-level example only provided to aid in the understanding of the present disclosure. In the example process 500, at block 502, the process receives a SYN issued from a client pod that is directed to an initial server pod. In some embodiments, the client pod is on a worker node and the client pod is running a containerized application (e.g., application 310 of FIG. 3) that depends on another containerized application that is replicated and running on a plurality of server pods, including the initial server pod, to accomplish its tasks.

At block 504, the process determines whether the SYN packet is associated with a record in a connection table stored in memory on the same worker node as the client pod. In some embodiments, the connection table is used to track the connection state of the client pod from the client's perspective. In some embodiments, the process attempts to match a record in the connection table with the SYN by attempting to match the source and destination of the SYN with the source and destination information of the records in the connection table. If an entry exists in the connection table that corresponds with the SYN sent from the client pod to the initial server pod, the process will consider the initial server pod unhealthy if a second consecutive SYN has been sent to the initial server pod from the client pod because the initial server pod did not acknowledge the first SYN. If the process finds a record in the connection table that corresponds with the SYN sent from the client pod, the process continues to block 506; otherwise the process continues to block 514.

Figure 6:
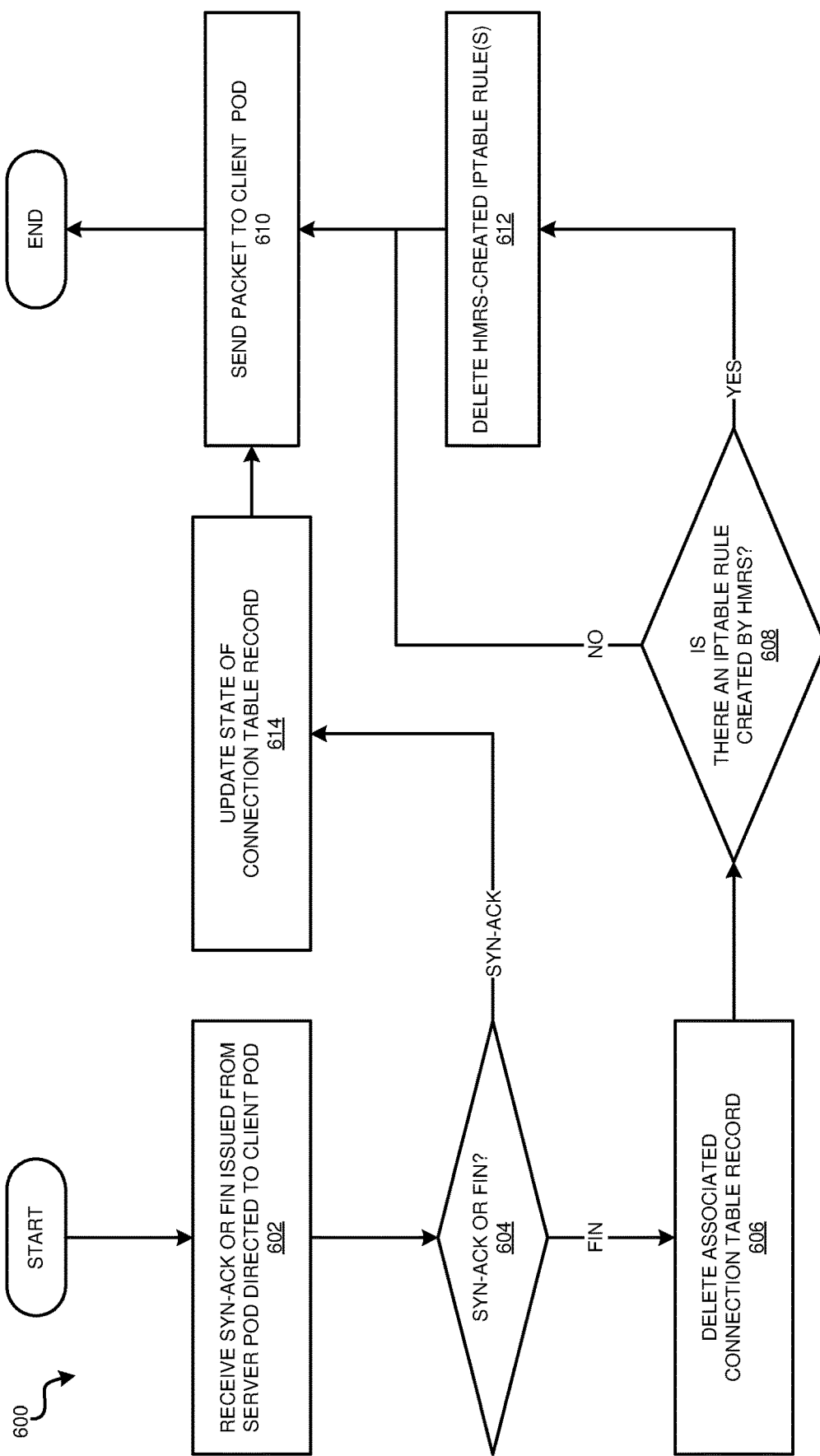
FIG. 6 depicts a flowchart of an example process for health monitoring and rerouting in accordance with an illustrative embodiment.
Figure 7:
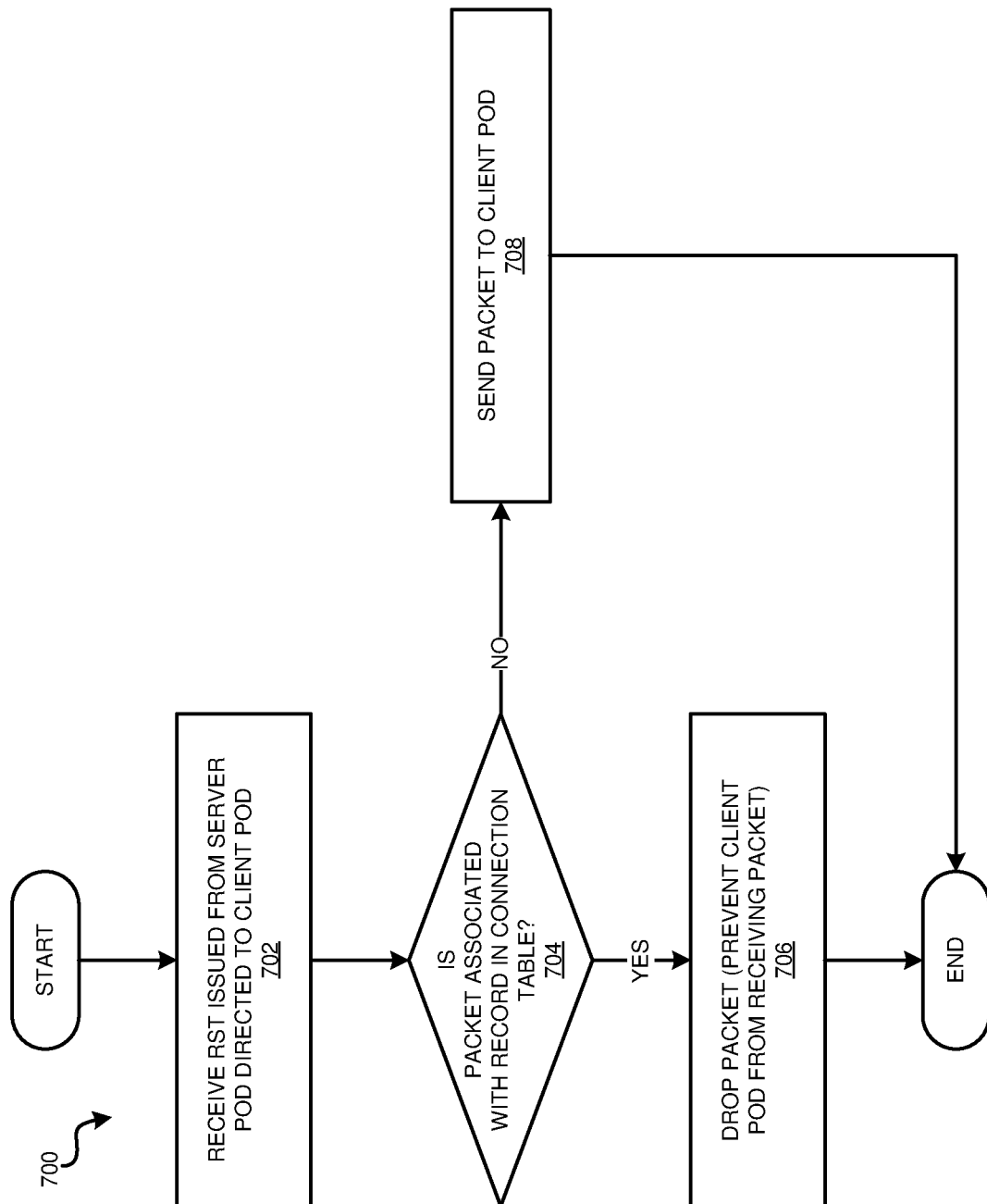
FIG. 7 depicts a flowchart of an example process for health monitoring and rerouting in accordance with an illustrative embodiment.

Note that if an entry exists in the connection table but instead of the packet being a second SYN from the client pod, the packet instead is a SYN-ACK or finish packet (FIN) from the initial server pod. An embodiment of a process for handling this scenario is shown in FIG. 6 and described below. If the packet is instead a reset message (RST) from the initial server pod, an embodiment of a process for handling this scenario is shown in FIG. 7 and described below.

If the SYN is a first SYN sent from the client pod to the initial server pod, there will be no record in the connection table that corresponds with the SYN, so the process will continue to block 514. At block 514, the process generates a first SYN record in a connection table, and then at block 516 the process forwards the SYN to the initial server pod.

If the SYN is a second SYN sent from the client pod to the initial server pod, e.g., as a retry message that is responsive to a predetermined amount of time passing without receiving a SYN-ACK from the initial server pod, there will be a record in the connection table that corresponds with the second SYN, so the process will continue to block 506. At block 506, the process generates a server pod status record that includes data indicative of the initial server pod having an unhealthy status and store this server pod status record in a status table in memory on the same worker node as the client pod.

Next, at block 508, the process identifies a replacement server pod that has a healthy status and the same containerized software (e.g., database 332 of FIG. 3) as the initial server pod. The process generates a detour routing rule in an IPtable stored in memory on the same worker node as the client pod requiring packets sent from the client pod to be routed to the replacement server pod.

Next, at block 510, since the client pod is no longer trying to establish a connection with the initial server pod, the SYN record for the first SYN may be deleted from the connection table. Next, at block 512, the second SYN is forwarded to the replacement server pod.

With reference to FIG. 6, this figure depicts a flowchart of an example process 600 for health monitoring and rerouting in accordance with an illustrative embodiment. In a particular embodiment, the process 600 describes an embodiment in which the packet received at block 502 of FIG. 5 is a SYN-ACK or FIN directed to the client pod (rather than a SYN issued to the client pod) as indicated at block 602.

In the example process 600, at block 602, the process receives a SYN-ACK or FIN issued to a client pod from a server pod. At block 604, if the packet is a SYN-ACK, the process continues to block 614; otherwise, if the packet is a FIN, the process continues to block 606. Note that if the packet is an RST from the initial server pod, an embodiment of a process for handling this scenario is shown in FIG. 7 and described below.

If the packet is a SYN-ACK sent from the initial server pod to the client pod, there will be a record in the connection table that corresponds with the SYN-ACK, and the process will continue to block 614. At block 614, the process updates the state of the connection table record to reflect that the SYN-ACK was received in response to a first SYN, and then at block 610 the process forwards the SYN-ACK to the client pod.

If the packet is a FIN sent from the initial server pod to the client pod, there will be a record in the connection table that corresponds with the FIN, and the process will continue to block 606. At block 606, the process deletes the connection table record(s) corresponding to the FIN and the connection between the client pod and the initial server pod. Next, at block 608, the process determines whether there is an IPtable rule associated with the connection between the client pod and the initial server pod. If so, the IPtable rule is deleted at block 612 and the process then continues to block 610. Otherwise, the process skips block 612 and continues to block 610. At block 610, the process forwards the FIN to the client pod.

With reference to FIG. 7, this figure depicts a flowchart of an example process 700 for health monitoring and rerouting in accordance with an illustrative embodiment. In a particular embodiment, the process 700 describes an embodiment in which the packet received at block 502 of FIG. 5 is an RST directed to the client pod (rather than a SYN issued to the client pod) as indicated at block 702.

In the example process 700, at block 702, the process receives an RST issued to a client pod from a server pod. At block 704, the process determines if there is a record in the connection table that corresponds with the RST. If the client pod has already sent a first SYN to the server pod, there will be a first SYN record in the connection table indicating that the client pod is waiting for a response to the first SYN. For example, in some embodiments, when the client pod sends the first SYN, the client pod begins a waiting period that lasts for a predetermined amount of time. During this waiting period, the client pod waits for a response to the first SYN. If the client pod does not receive a response to the first SYN during this waiting period, then upon conclusion of the waiting period, the client pod will send a second SYN as a retry message. However, in some situations, the server pod will respond to the first SYN during the waiting period with an RST. In this situation, the process determines that there is a record in the connection table that corresponds with the RST, so the process continues to block 706.

At block 706, the process drops the RST packet, thereby intercepting the RST so as to prevent the RST from reaching the client pod. This RST is an indication that the initial server pod is unhealthy, so preventing the RST from reaching the client pod will cause the client pod to continue waiting. Upon conclusion of the waiting period, the client pod will send a second SYN as a retry message, which will trigger the YES branch from block 504 of the process 500 of FIG. 5 described above.

At block 704, if the process determines if there is not a record in the connection table that corresponds with the RST, the process continues to block 708. At block 708, the process forwards the RST to the client pod, and then the process is completed.

With reference to FIG. 8, this figure depicts a flowchart of an example process 800 for health monitoring and rerouting in accordance with an illustrative embodiment. In a particular embodiment, the HMRS 320 of FIG. 3 or the HMRS illustrated in FIG. 4 carries out the process 800.

In an embodiment, at block 802, the process detects, by a packet detection module on a first worker node, a SYN issued from a client pod on the first worker node and directed to a first server pod on a second worker node. Next, at block 804, the process generates a first SYN record in a connection table stored in memory on the first worker node. The first SYN record includes data indicative of the detected first SYN, such as the source and destination IP addresses. Next, at block 806, the process detects, by the packet detection module on the first worker node, a second SYN issued from the client pod on the first worker node and directed to the first server pod on the second worker node. Next, at block 808, the process generates a server pod status record stored in memory on the first worker node. The server pod status record includes data indicative of the first server pod having an unhealthy status. Next, at block 810, the process identifies an available server pod having a healthy status. Next, at block 812, the process generates a detour routing rule in a routing table on the first worker node indicative of a revised connection in which the identified available server pod replaces the first server pod as a second server pod for the client pod.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "illustrative" is used herein to mean "serving as an example, instance or illustration." Any embodiment or design described herein as "illustrative" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include an indirect "connection" and a direct "connection."

References in the specification to "one embodiment," "an embodiment," "an example embodiment," etc., indicate that the embodiment described can include a particular feature, structure, or characteristic, but every embodiment may or may not include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

Thus, a computer implemented method, system or apparatus, and computer program product are provided in the illustrative embodiments for managing participation in online communities and other related features, functions, or operations. Where an embodiment or a portion thereof is described with respect to a type of device, the computer implemented method, system or apparatus, the computer program product, or a portion thereof, are adapted or configured for use with a suitable and comparable manifestation of that type of device.

Where an embodiment is described as implemented in an application, the delivery of the application in a Software as a Service (SaaS) model is contemplated within the scope of the illustrative embodiments. In a SaaS model, the capability of the application implementing an embodiment is provided to a user by executing the application in a cloud infrastructure. The user can access the application using a variety of client devices through a thin client interface such as a web browser (e.g., web-based e-mail), or other light-weight client-applications. The user does not manage or control the underlying cloud infrastructure including the network, servers, operating systems, or the storage of the cloud infrastructure. In some cases, the user may not even manage or control the capabilities of the SaaS application. In some other cases, the SaaS implementation of the application may permit a possible exception of limited user-specific application configuration settings.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM) or Flash memory, a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Embodiments of the present invention may also be delivered as part of a service engagement with a client corporation, nonprofit organization, government entity, internal organizational structure, or the like. Aspects of these embodiments may include configuring a computer system to perform, and deploying software, hardware, and web services that implement, some or all of the methods described herein. Aspects of these embodiments may also include analyzing the client's operations, creating recommendations responsive to the analysis, building systems that implement portions of the recommendations, integrating the systems into existing processes and infrastructure, metering use of the systems, allocating expenses to users of the systems, and billing for use of the systems. Although the above embodiments of present invention each have been described by stating their individual advantages, respectively, present invention is not limited to a particular combination thereof. To the contrary, such embodiments may also be combined in any way and number according to the intended deployment of present invention without losing their beneficial effects.

What is claimed is:

1. A computer-implemented method comprising:
   detecting, by a packet detection module on a first worker node, a first synchronization message (SYN) issued from a client pod on the first worker node as an attempt to establish a Transmission Control Protocol (TCP) network connection with a first server pod on a second worker node;
   generating a first SYN record in a connection table stored in memory on the first worker node, wherein the first SYN record includes data indicative of the detected first SYN;
   detecting, by the packet detection module on the first worker node, a second SYN issued from the client pod on the first worker node furthering the attempt to establish the TCP network connection with the first server pod on the second worker node;
   generating a server pod status record stored in memory on the first worker node, wherein the server pod status record includes data indicative of the first server pod having an unhealthy status;
   identifying an available server pod having a healthy status;
   generating a detour routing rule in a routing table on the first worker node indicative of a revised connection in which the identified available server pod replaces the first server pod as a second server pod for the client pod; and
   deleting, at a future time, and responsive to a number of records in the connection table lacking data matching the detour routing rule, the detour routing rule.

2. The computer-implemented method of claim 1, wherein the second SYN issued from the client pod is a retry message responsive to completion of a waiting period without receiving a synchronize and acknowledge message (SYN-ACK) from the first server pod acknowledging the first SYN.

3. The computer-implemented method of claim 2, further comprising:
   intercepting a reset message (RST) received from the first server pod during the waiting period, wherein the intercepting of the RST prevents the client pod from receiving the RST.

4. The computer-implemented method of claim 1, further comprising:
   removing, responsive to detecting the second SYN, the first SYN record from the connection table.

5. The computer-implemented method of claim 1, wherein the packet detection module comprises a daemon running on the first worker node.

6. The computer-implemented method of claim 5, further comprising:
   launching, by the daemon responsive to detecting the first SYN, a high availability (HA) checker module on the first worker node.

7. The computer-implemented method of claim 6, further comprising:
   iterating, by the HA checker module, through each record in the connection table, comparing data in each record to the detour routing rule.

8. The computer-implemented method of claim 7, further comprising:
   incrementing a counter upon determining that each record in the connection table lacks data that matches the detour routing rule; and
   comparing the counter to a counter threshold value, wherein the deleting the detour routing rule is further responsive to determining that the counter satisfies the threshold value.

9. A computer program product comprising one or more computer readable storage media, and program instructions collectively stored on the one or more computer readable storage media, the program instructions executable by a processor to cause the processor to perform operations comprising:
   detecting, by a packet detection module on a first worker node, a first synchronization message (SYN) issued from a client pod on the first worker node as an attempt to establish a Transmission Control Protocol (TCP) network connection with a first server pod on a second worker node;

generating a first SYN record in a connection table stored in memory on the first worker node, wherein the first SYN record includes data indicative of the detected first SYN;

detecting, by the packet detection module on the first worker node, a second SYN issued from the client pod on the first worker node furthering the attempt to establish the TCP network connection with the first server pod on the second worker node;

generating a server pod status record stored in memory on the first worker node, wherein the server pod status record includes data indicative of the first server pod having an unhealthy status;

identifying an available server pod having a healthy status;

generating a detour routing rule in a routing table on the first worker node indicative of a revised connection in which the identified available server pod replaces the first server pod as a second server pod for the client pod; and deleting, at a future time, and responsive to a number of records in the connection table lacking data matching the detour routing rule, the detour routing rule.

10. The computer program product of claim 9, wherein the stored program instructions are stored in a computer readable storage device in a data processing system, and wherein the stored program instructions are transferred over a network from a remote data processing system.

11. The computer program product of claim 9, wherein the stored program instructions are stored in a computer readable storage device in a server data processing system, and wherein the stored program instructions are downloaded in response to a request over a network to a remote data processing system for use in a computer readable storage device associated with the remote data processing system, further comprising:
program instructions to meter use of the program instructions associated with the request; and
program instructions to generate an invoice based on the metered use.

12. The computer program product of claim 9, wherein the second SYN issued from the client pod is a retry message responsive to completion of a waiting period without receiving a synchronize and acknowledge message (SYN-ACK) from the first server pod acknowledging the first SYN.

13. The computer program product of claim 12, further comprising:
intercepting a reset message (RST) received from the first server pod during the waiting period, wherein the intercepting of the RST prevents the client pod from receiving the RST.

14. The computer program product of claim 9, further comprising:
removing, responsive to detecting the second SYN, the first SYN record from the connection table.

15. The computer program product of claim 9, wherein the packet detection module comprises a daemon running on the first worker node.

16. A computer system comprising a processor and one or more computer readable storage media, and program instructions collectively stored on the one or more computer readable storage media, the program instructions executable by the processor to cause the processor to perform operations comprising:
detecting, by a packet detection module on a first worker node, a first synchronization message (SYN) issued from a client pod on the first worker node as an attempt to establish a Transmission Control Protocol (TCP) network connection with a first server pod on a second worker node;
generating a first SYN record in a connection table stored in memory on the first worker node, wherein the first SYN record includes data indicative of the detected first SYN;
detecting, by the packet detection module on the first worker node, a second SYN issued from the client pod on the first worker node furthering the attempt to establish the TCP network connection with the first server pod on the second worker node;
generating a server pod status record stored in memory on the first worker node, wherein the server pod status record includes data indicative of the first server pod having an unhealthy status;
identifying an available server pod having a healthy status;
generating a detour routing rule in a routing table on the first worker node indicative of a revised connection in which the identified available server pod replaces the first server pod as a second server pod for the client pod and
deleting, at a future time, and responsive to a number of records in the connection table lacking data matching the detour routing rule, the detour routing rule.

17. The computer system of claim 16, wherein the second SYN issued from the client pod is a retry message responsive to a predetermined amount of time passing without receiving a synchronize and acknowledge message (SYN-ACK) from the first server pod acknowledging the first SYN.

18. The computer system of claim 16, wherein the second SYN issued from the client pod is a retry message responsive to reset message (RST) from the first server pod.

19. The computer system of claim 16, further comprising:
removing, responsive to detecting the second SYN, the first SYN record from the connection table.

20. The computer system of claim 16, wherein the packet detection module comprises a daemon running on the first worker node.

* * * * *